United States Patent
Lindgren et al.

(10) Patent No.: US 8,051,129 B2
(45) Date of Patent: Nov. 1, 2011

(54) ARRANGEMENT AND METHOD FOR REDUCING REQUIRED MEMORY USAGE BETWEEN COMMUNICATION SERVERS

(75) Inventors: Anders Lindgren, Älvsjö (SE); Christer Boberg, Tungelsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1388 days.

(21) Appl. No.: 11/559,203

(22) Filed: Nov. 13, 2006

(65) Prior Publication Data

US 2008/0043723 A1    Feb. 21, 2008

Related U.S. Application Data

(60) Provisional application No. 60/806,656, filed on Jul. 6, 2006.

(51) Int. Cl.
G06F 15/16    (2006.01)
(52) U.S. Cl. .................................. 709/204; 370/352
(58) Field of Classification Search .................. 709/204
See application file for complete search history.

(56) References Cited

U.S. PATENT DOCUMENTS

| 2002/0103898 A1 | 8/2002 | Moryer et al. |
| 2004/0003046 A1* | 1/2004 | Grabelsky et al. ............ 709/206 |
| 2005/0010758 A1 | 1/2005 | Landrock et al. |
| 2005/0232408 A1 | 10/2005 | Hodson et al. |

FOREIGN PATENT DOCUMENTS

WO    WO 2006108168 A2    10/2006

OTHER PUBLICATIONS

A. Niemi, Ed; "Session Initiation Protocol (SIP) Extension for Event State Publication," Network Working Group, Request for Comments: 3903, Category: Standards Track, Nokia, Oct. 2004.
J. Rosenberg, "A Session Initiation Protocol (SIP) Event Package for Registrations," Network Working Group, Request for Comments: 3680, Category: Standard Track, Dynamicsoft, Mar. 2004.
A. B. Roach, "Session Initiation Protocol (SIP)-Specific Event Notification," Network Working Group, Request for Comments: 3265, Updated: 2543, Category: Standards Track, Dynamicsoft, Jun. 2002.

* cited by examiner

*Primary Examiner* — Wing Chan
*Assistant Examiner* — Andrew Woo

(57) ABSTRACT

An arrangement and method for reducing memory usage for communications between servers in a communication network utilizing the Session Initiation Protocol (SIP) by controlling establishment of SIP dialogues. A single SIP dialogue for a certain event package is utilized for multiple subscriptions between one instance of a requesting server such as a Resource List Server (RLS) and one instance of an Application Server such as, for example, a Presence Server. The SIP dialogue is then used to send all SIP NOTIFY messages between these two entities to reduce memory usage at both ends by removing the overhead created by SIP.

11 Claims, 2 Drawing Sheets

ARRANGEMENT AND METHOD FOR REDUCING REQUIRED MEMORY USAGE BETWEEN COMMUNICATION SERVERS

CROSS-REFERENCE TO RELATED APPLICATIONS

This application claims benefit of U.S. Provisional Application No. 60/806,656 filed Jul. 6, 2006, the disclosure of which is incorporated herein by reference.

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND OF THE INVENTION

This invention relates to communication systems. More particularly, and not by way of limitation, the invention is directed to an arrangement and method for reducing memory usage on both ends of a communication between servers in a communication network.

In communication networks utilizing the Session Initiation Protocol (SIP), such as an IP Multimedia Subsystem (IMS) network, a SIP SUBSCRIBE message is used to subscribe to changes of a state belonging to a user in the IMS network. When the User state is changed, a SIP NOTIFY message is sent from a Notifying server to the subscribing user. In the IMS network, due to scaling reasons, there are a number of SIP application servers (AS's) that each serve a number of users in a domain. The allocation of users to a certain instance of an AS is handled by the IMS network, and a Subscribing AS does not know which Notifying AS contains the User state. To find the correct Notifying AS, the Subscribing AS sends the SUBSCRIBE Message to the IMS core network which in turn routes the message to the correct Notifying AS.

Every SUBSCRIBE/NOTIFY pair of messages needs its own SIP dialogue. This requires that a number of SIP dialogues be set up between a Subscribing AS and a Notifying AS. The dialogues are maintained during the lifetime of the subscription. A dialogue may exist for a long time, even though the number of NOTIFY messages sent may be rather low during the lifetime of the subscription. Still there is often a need to have a NOTIFY message sent in real time. Therefore, a pull-based solution is not preferred.

Examples of States that are handled in this way are Presence and XCAP document changes as defined by IETF, 3GPP, and OMA standards.

The existing solution forces the Subscribing and Notifying ASs to keep one state for the Subscribe dialogue per user and AS. Every dialogue requires some memory usage. Assuming, for example, there are one million users in an IMS domain and 100,000 users allocated per AS, this means that there are ten Subscribing ASs and ten Notifying ASs. If every user is subscribing to one other user, there will be one million SIP dialogues. If every dialogue requires 2 Kbytes of basic memory per AS, a total of 2 Gbytes of memory will be required for the dialogues. If it is assumed that every user subscribes to ten other users, then 20 Gbytes of memory will be required, and so on.

Memory usage rather than the number of transactions per second is the larger problem in this scenario because the frequency of NOTIFY messages is assumed to be quite low.

What is needed in the art is an arrangement and method for reducing the amount of memory required for storing SIP dialogues. The present invention provides such an arrangement and method.

BRIEF SUMMARY OF THE INVENTION

In one embodiment, the present invention provides a method by which a single SIP dialogue for a certain event package is utilized for multiple subscriptions between one instance of a Resource List Server (RLS) and one instance of an Application Server such as, for example, a Presence Server. The SIP dialogue is then used to send all SIP NOTIFY messages between these two entities to reduce memory usage at both ends by removing the overhead created by SIP.

The invention reduces the number of SIP dialogues needed in the system to support functionality for a SIP SUBSCRIBE exploder such as the RLS. Since each SIP dialogue requires allocation of a significant amount of resources such as memory and disk space, the invention significantly reduces the amount of hardware needed. The invention is particularly valuable in the case of large contact lists where the number of established sessions is very large when utilizing standardized SIP signaling. The invention scales much better than existing solutions, and the size of the contact list does not significantly affect the dimensioning of a system in the same way as the prior art solution.

In one aspect, the present invention is directed to a method of reducing memory usage in first and second servers communicating in a communication network. The method includes establishing a dialogue between the first and second servers to support a first request and response message pair sent between the two servers; and utilizing the established dialogue to support a second request and response message pair subsequently sent between the two servers. In this manner, the number of dialogues between the first and second servers is reduced, together with the associated memory usage.

In another aspect, the present invention is directed to a method of reducing memory usage in first and second servers communicating in a communication network, wherein an established dialogue exists between the first and second servers. The method includes sending a subscription request message from the first server to the second server; determining in the second server that the established dialogue exists with the first server; and utilizing the existing established dialogue to support the requested subscription.

In another aspect, the present invention is directed to a method of reducing memory usage in first and second servers communicating in a communication network, wherein an established dialogue exists between the first and second servers. The method includes receiving in the second server, a subscription request message from the first server; and determining in the second server whether an established dialogue already exists with the first server. If an established dialogue does not already exist with the first server, the method includes creating by the second server, a new subscription; and sending a first type of response message from the second server to the first server identifying the new subscription. If an established dialogue already exists with the first server, the method includes creating by the second server, a relation between the requested subscription and the existing established dialogue; and sending a second type of response message from the second server to the first server identifying the existing established dialogue.

In another aspect, the present invention is directed to an arrangement in an application server in a communication network for controlling establishment of dialogues with other servers, wherein an established dialogue exists between the application server and a requesting server. The arrangement includes means for receiving a subscription request message from the requesting server; and logic for determining whether an established dialogue already exists with the requesting server. The arrangement also includes means responsive to a determination that an established dialogue does not already exist with the requesting server for creating a new subscription, and for sending a first type of response message to the requesting server identifying the new subscription. The arrangement further comprises means responsive to a determination that an established dialogue already exists with the requesting server for creating a relation between the requested subscription and the existing established dialogue, for sending a second type of response message to the requesting server identifying the existing established dialogue, and for utilizing the existing established dialogue to support the requested subscription.

In another aspect, the present invention is directed to an arrangement in a requesting server in a communication network for controlling establishment of dialogues with other servers, wherein an established dialogue exists between the requesting server and an application server. The arrangement includes means for sending a subscription request message to the application server and for receiving a response message from the application server; and logic for determining whether the response message indicates an established dialogue already exists with the requesting server. The arrangement also includes means for establishing a new dialogue in response to a determination that the response message indicates an established dialogue does not already exist with the requesting server. The arrangement further comprises means for utilizing the existing established dialogue to support the requested subscription in response to a determination that the response message indicates an established dialogue already exists with the requesting server.

BRIEF DESCRIPTION OF THE SEVERAL VIEWS OF THE DRAWING

In the following, the essential features of the invention will be described in detail by showing preferred embodiments, with reference to the attached figures in which.

DETAILED DESCRIPTION OF THE INVENTION

In one embodiment, the present invention provides a single SIP SUBSCRIBE dialogue for a certain event package between one instance of a Resource List Server (RLS) and one instance of an Application Server such as, for example, a Presence Server. This dialogue is then used to send all SIP NOTIFY messages between these two entities inside this single dialogue to reduce memory usage at both ends by removing the overhead created by SIP. The invention is generic for any type of SUBSCRIBE exploder and the corresponding NOTIFY servers, or any type of application server having multiple subscriptions towards another application server. This embodiment makes use of the existing SIP protocol with some extensions resulting in a solution that is backwards-compatible with existing "non-tunneling" servers.

The invention reduces the amount of memory used in IMS Networks. One dialogue is utilized per peer of Subscribing AS and Notifying AS. The single dialogue is utilized to tunnel all NOTIFY messages. In the example above, in which there are one million users in an IMS domain and each user subscribes to one other user, there were one million dialogues requiring 2 Gbytes of memory when utilizing existing procedures. The present invention reduces the number of dialogues to only 100 dialogues using 4 Kbytes of basic data each. Thus, a total of only 400 Kbytes of memory is required. For every user dialogue, an extra 0.1 Kbyte is needed. So instead of adding 4 Kbytes per new dialogue as in the prior art, the invention adds only 0.2 Kbytes for each new dialogue.

Further, the present invention utilizes existing IMS routing procedures to find the Notifying AS. If a dialogue already exists between these two instances, the invention informs the Subscribing AS that the NOTIFY messages will be sent in the existing "common" dialogue instead of in a separate dialogue for this particular subscription.

The invention also reduces the number of SIP SUBSCRIBE messages due to refresh procedures because only one dialogue needs to be refreshed. Consequently, processor resources are also saved.

Figure 1:
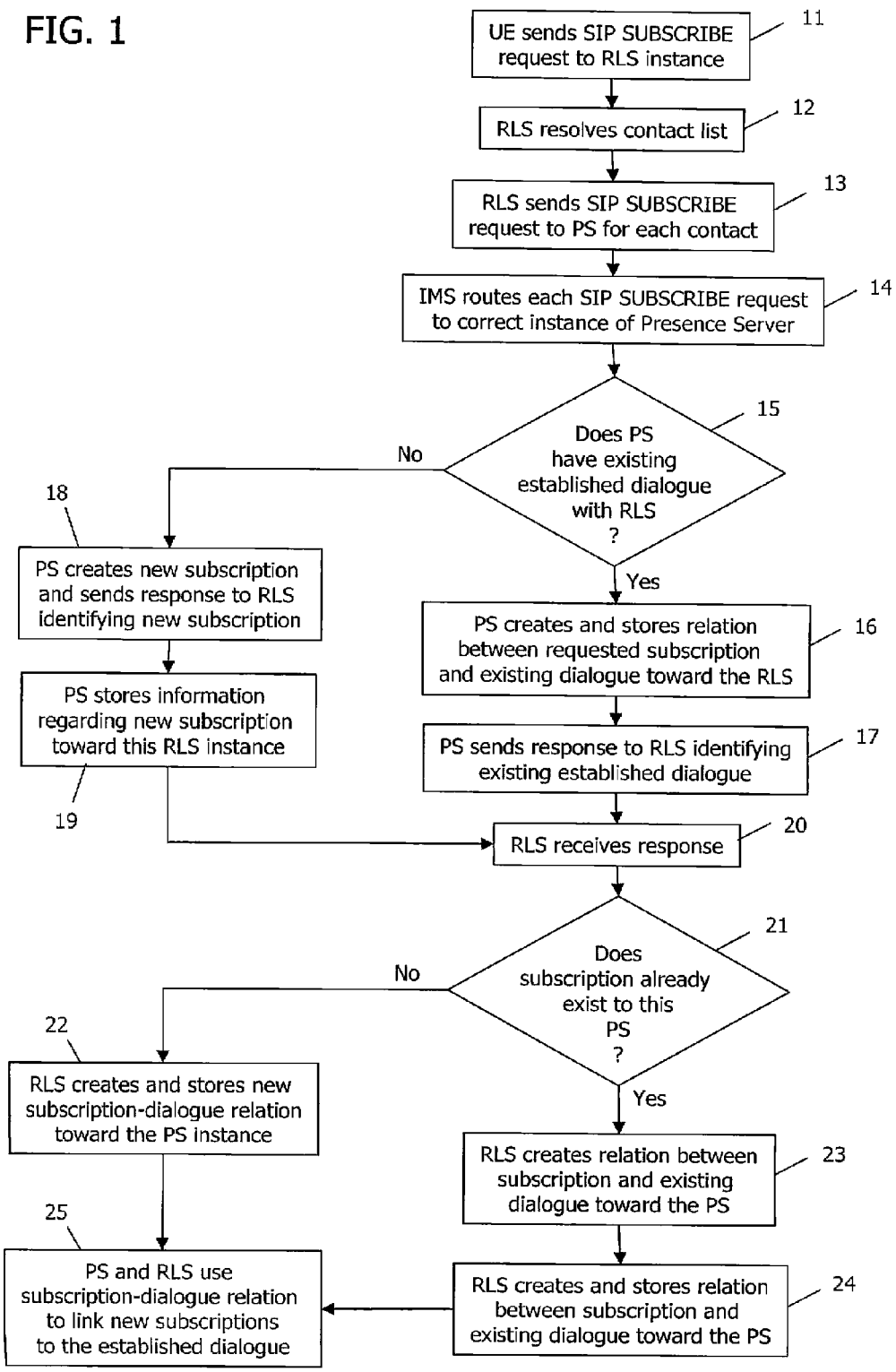
FIG. 1 is a flow chart illustrating the steps of an exemplary embodiment of the present invention.

FIG. 1 is a flow chart illustrating the steps of an exemplary embodiment of the present invention. By way of example, the application server is presented as a Presence Server although other types of application servers are equally applicable. At step 11, a user equipment (UE) sends a SIP SUBSCRIBE request to an RLS instance requesting the creation of a subscription to multiple resources by using a specific URI pointing at a contact list. The IMS core network routes the request to the RLS instance where this contact list is to be handled. At step 12, the RLS resolves the requested list. At step 13, the RLS instance sends a SIP SUBSCRIBE request to the Presence Servers (PS's) for each contact requesting to create one back-end subscription for each resource in the contact list. The RLS includes information in the request about its capability to support SIP tunneling, and identifies the requesting RLS instance. This information may be, for example, a new value such as "sip-tunneling" in the "supported" header. At step 14, the IMS core network routes each SIP SUBSCRIBE request as normal to the correct instance of the Presence Server based on the information in the Request-URI.

At step 15, the Presence Server receives the SIP SUBSCRIBE request and detects the RLS capability to support SIP Tunneling by examining the "supported" header. The PS determines whether it already has an existing established dialogue with the requesting RLS by comparing the "contact" header value with the information that is stored in the PS about ongoing subscriptions. If the PS has an existing established dialogue with this RLS, the method moves to step 16 where the PS creates and stores a relation between the requested subscription and the existing established dialogue toward the RLS. At step 17, the PS sends a response to the RLS and includes an indication that an active subscription with dialogue already exists between the RLS and the PS. In one embodiment, a "301 Moved Permanently" response code is included in the response, and the contact information is used to indicate to the RLS that a subscription already exists.

If the PS does not have an existing established dialogue with this RLS, the method moves to step 18 where the PS creates a new subscription and returns a response to the RLS with an ID identifying the new subscription. The response may be sent in a SIP 200 OK message. At step 19, the PS stores information locally regarding the new active subscription towards this RLS instance. The PS may utilize the "contact" header value in the SIP SUBSCRIBE request to identify the RLS instance. The PS stores information that ties a specific subscription to a specific RLS instance.

At step 20, the RLS receives the response. At step 21, the RLS determines whether a subscription already exists to this Presence Server instance by examining the received response. If a 200 OK response code is received, the RLS knows that no subscription exists. If a "301" response is received, the RLS knows that a subscription already exists. If a subscription does not exist, the method moves to step 22 where the RLS uses the information in the contact header of the 200 OK response message to create a new subscription-dialogue relation towards that particular instance of the Presence Server. The RLS stores the subscription-dialogue relation locally as long as the RLS subscription exists.

Note that if the RLS detects that it already has a dialogue towards this PS instance, it knows that this dialogue has been terminated and it has to re-create subscriptions for all existing back-end subscriptions towards this PS instance using the newly created dialogue. The situation is the same if the RLS tries to refresh the dialogue for any reason and a "481 Call transaction does not exist" is received.

If the RLS determines at step 21 that a subscription already exists to this Presence Server instance, the method moves to step 23 where the RLS uses the information in the contact header of the 301 response message to create a subscription-dialogue relation between the incoming RLS subscription and the already existing dialogue towards the PS. The RLS stores the subscription-dialogue relation locally as long as the RLS subscription exists.

The RLS also returns a unique ID pointing out the specific subscription-dialogue relation for this particular subscription. This information could be included either in an extra route header or in an additional header used by the RLS internally.

At step 25, both the RLS and the Presence Server have a subscription-dialogue relation between the RLS instance and the PS instance. Any new subscription created between that particular RLS/PS instance pair will use the same established dialogue.

Thereafter, the Presence Server sends the Presence Notifications using the established dialogue with the extra identifiers pointing out the requesting RLS instance. The RLS, in turn, uses this added information to find the original RLS subscription from the UE for which the notification is intended. Note that if only one subscription can exist between the Notifying server and the subscriber for a certain resource, this extra identifier is not needed, and the information in the 'From' header can be used to identify this particular resource.

When the last subscription in the RLS/PS instance pair is removed, the dialogue is terminated. Consequently, very long expiration times can be used to reduce the number of refresh messages.

If the RLS receives a subscription terminate request from the PS, the RLS behaves as normal, and may either attempt to renew the subscription or remove information locally regarding the back-end subscription. The RLS and the PS still have to store information that is unique for a particular subscription and that is not directly related to the SIP dialogue. Depending on how much data is related to the subscription, the amount of required memory will differ. However, the saving of memory related to the SIP dialogue is still the same.

Figure 2:
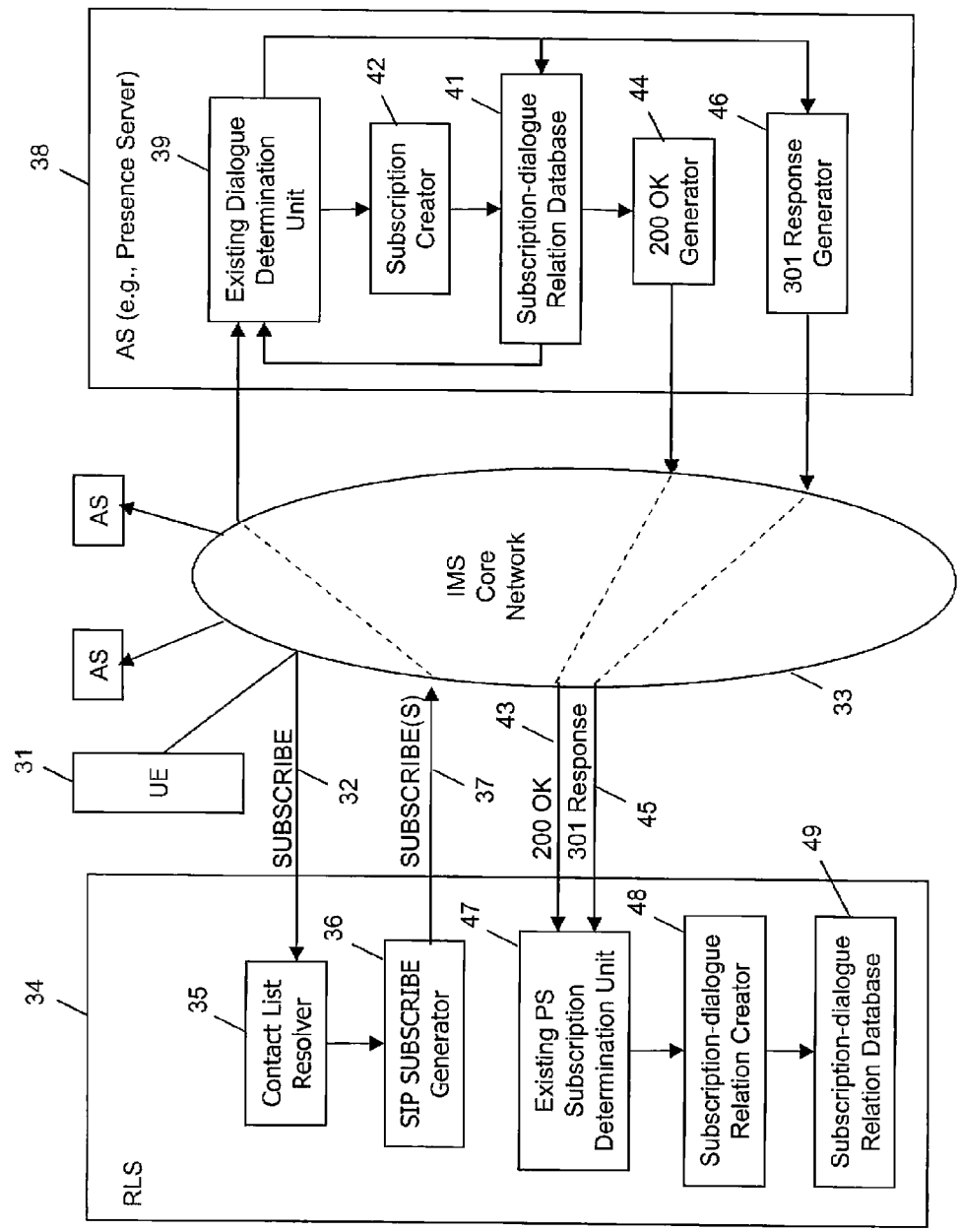
FIG. 2 is a simplified block diagram of an exemplary embodiment of the system of the present invention.

FIG. 2 is a simplified block diagram of an exemplary embodiment of the system of the present invention. A user equipment (UE) 31 sends a SIP SUBSCRIBE request message 32 via an IMS core network 33 to an RLS instance 34 requesting the creation of a subscription to multiple resources by using a specific URI pointing at a contact list. A contact list resolver 35 in the RLS resolves the requested list. A SIP SUBSCRIBE generator 36 in the RLS sends SIP SUBSCRIBE requests 37 to the application server for each contact via the IMS core network. By way of example, a Presence Server (PS) 38 is illustrated here. The SUBSCRIBE messages request to create one back-end subscription for each resource in the contact list. The RLS includes information in the request about its ability to support SIP tunneling, and identifies the requesting RLS instance. This information may be, for example, a new value such as "sip-tunneling" in the "supported" header.

The PS 38 receives the SIP SUBSCRIBE request 37 and detects the capability of the RLS 34 to support SIP Tunneling by examining the "supported" header. An existing dialogue determination unit 39 in the PS determines whether it already has an existing established dialogue with the requesting RLS by comparing the "contact" header value with the information that is stored in the PS about ongoing subscriptions. This information may be stored in a subscription-dialogue relation database 41. If the PS does not have an existing established dialogue with this RLS, a subscription creator 42 in the PS creates a new subscription. Information about the new subscription is stored in the subscription-dialogue database. The PS may utilize the "contact" header value in the SIP SUBSCRIBE request 37 to identify the RLS instance, and stores information that ties a specific subscription to a specific RLS instance.

The PS 38 returns a response to the RLS 34 via the IMS core network with an ID identifying the new or existing subscription. If the PS did not have an existing established dialogue with the RLS 34, a 200 OK response 43 may be generated by a SIP 200 OK message generator 44. If the PS had an existing established dialogue with the RLS, a 301 response 45 may be generated by a SIP 301 response generator 46.

The RLS 34 receives the response, and an existing PS subscription determination unit 47 in the RLS determines whether a subscription already exists to this PS instance by examining the received response. If a 200 OK response 43 is received, the RLS knows that no subscription exists. If a "301" response 45 is received, the RLS knows that a subscription already exists. If a subscription does not exist, a subscription-dialogue relation creator 48 in the RLS uses the information in the contact header of the 200 OK response message to create a new subscription-dialogue relation towards that particular instance of the PS 38. The RLS stores the subscription-dialogue relation locally in a subscription-dialogue relation database 49 as long as the RLS subscription exists. If a subscription already exists to this instance of the PS, the RLS uses the information in the contact header of the 301 response message to create a subscription-dialogue relation between the incoming RLS subscription and the already existing dialogue towards the PS. The RLS stores the subscription-dialogue relation locally in the subscription-dialogue database 49 as long as the RLS subscription exists.

The RLS also returns a unique ID pointing out the specific subscription-dialogue relation for this particular subscription. This information could be included either in an extra route header or in an additional header used by the RLS internally.

Thereafter, any new subscription created between that particular RLS/PS instance pair will use the same established dialogue.

Although preferred embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention. The specification contemplates any all modifications that fall within the scope of the invention defined by the following claims.

What is claimed is:

1. A method of reducing memory usage in first and second servers communicating in a communication network, said method comprising:

establishing a Session Initiation Protocol (SIP) dialogue between the first and second servers to support a first SIP request and SIP response message pair sent between the two servers; and utilizing the established SIP dialogue to support a second SIP request and SIP response message pair subsequently sent between the two servers, wherein the utilizing step includes:

creating and storing by the second server, a subscription-dialogue relation associating the second SIP request and SIP response message pair with the established SIP dialogue;

sending the SIP response message from the second server to the first server identifying the existing established SIP dialogue, wherein the second server sends a first type of SIP response message to the first server when an established SIP dialogue does not already exist with the first server, and sends a second type of SIP response message to the first server when an established SIP dialogue already exists with the first server, wherein the second type of SIP response message is different from the first type of SIP response message;

creating and storing by the first server, a subscription-dialogue relation associating the requested SIP subscription with the established SIP dialogue; and utilizing the stored subscription-dialogue relation to link the second SIP request and SIP response message pair to the established SIP dialogue;

wherein the number of SIP dialogues between the first and second servers is reduced, together with the associated memory usage.

2. The method according to claim 1, wherein the communication network is an IP Multimedia Subsystem (IMS) network and the first and second SIP request and SIP response message pairs each comprise a SIP SUBSCRIBE and SIP NOTIFY messages.

3. The method of reducing memory usage in first and second servers communicating in a communication network, wherein an established Session Initiation Protocol (SIP) dialogue exists between the first and second servers before the first server sends a SIP subscription request message to the second server, said method comprising:

sending the SIP subscription request message from the first server to the second server;

determining in the second server that the established SIP dialogue exists with the first server; and utilizing the existing established SIP dialogue to support the requested SIP subscription;

creating and storing by the second server, a subscription-dialogue relation associating the requested SIP subscription with the established SIP dialogue;

sending a SIP response message from the second server to the first server identifying the existing established SIP dialogue, wherein the second server sends a first type of SIP response message to the first server when an established SIP dialogue does not already exist with the first server, and sends a second type of SIP response message to the first server when an established SIP dialogue already exists with the first server, wherein the second type of SIP response message is different from the first type of SIP response message;

creating and storing by the first server, a subscription-dialogue relation associating the requested SIP subscription with the established SIP dialogue; and utilizing the stored subscription-dialogue relation to link new SIP subscriptions between the first and second servers to the established SIP dialogue.

4. The method according to claim 3, wherein the communication network is an IP Multimedia Subsystem (IMS) network.

5. A method of reducing memory usage in first and second servers communicating in a communication network, said method comprising:

receiving in the second server, a Session Initiation Protocol (SIP) subscription request message from the first server;

determining in the second server whether an established SIP dialogue already exists with the first server;

if an established SIP dialogue does not already exist with the first server:

creating by the second server, a new SIP subscription; and sending a first type of SIP response message from the second server to the first server identifying the new SIP subscription; and if an established SIP dialogue already exists with the first server:

creating by the second server, a subscription-dialogue relation between the requested SIP subscription and the existing established SIP dialogue; and sending a second type of SIP response message from the second server to the first server identifying the existing established SIP dialogue, wherein the second type of SIP response message is different from the first type of SIP response message;

creating and storing by the first server, a subscription-dialogue relation associating the requested SIP subscription with the established SIP dialogue; and utilizing the stored subscription-dialogue relation to link the requested SIP subscription to the established SIP dialogue.

6. The method according to claim 5, further comprising:

storing by the first server, a subscription-dialogue relation associating the established SIP dialogue with the second server;

storing by the second server, a subscription-dialogue relation associating the established SIP dialogue with the first server; and utilizing the stored subscription dialogue relations by the first and second servers to link new SIP subscriptions to the established SIP dialogue.

7. The method according to claim 5, wherein the communication network is an IP Multimedia Subsystem (IMS) network and the SIP subscription request message is a SIP SUBSCRIBE message, the first type of SIP response message is a SIP 200 OK message, and the second type of SIP response message is a SIP 301 Moved Permanently message.

8. An application server in a communication network for controlling establishment of Session Initiation Protocol (SIP) dialogues with other servers, wherein an established SIP dialogue exists between the application server and a requesting server, said application server comprising:

a processor;

a non-transitory memory coupled to the processor, said memory storing computer program instructions, wherein when the processor executes the computer program instructions, the processor causes the application server to:

receive a SIP subscription request message from the requesting server;

determine whether an established SIP dialogue already exists with the requesting server;

create a new SIP subscription in response to a determination that an established SIP dialogue does not already exist with the requesting server, and send a first type of SIP response message to the requesting server identifying the new SIP subscription; and create a subscription-dialogue relation between the requested SIP subscription and the existing established SIP dialogue in response to a determination that an established SIP dialogue already exists with the requesting server, send a second type of SIP response message to the requesting server identifying the existing established SIP dialogue, and utilize the existing established SIP dialogue to support the requested SIP subscription, wherein the second type of SIP response message is different from the first type of SIP response message; and store the subscription-dialogue relation in a storage device;

wherein, in response to receiving additional SIP subscription request messages, the determining logic accesses the storage device to determine whether an established SIP dialogue already exists with the requesting server.

9. The application server according to claim 8, wherein the communication network is an IP Multimedia Subsystem (IMS) network and, wherein:

the application server is a presence server;

the requesting server is a Resource List Server;

the SIP subscription request message is a SIP SUBSCRIBE message;

the first type of SIP response message is a SIP 200 OK message; and the second type of SIP response message is a SIP 301 Moved Permanently message.

10. A requesting server in a communication network for controlling establishment of Session Initiation Protocol (SIP) dialogues with other servers, said requesting server comprising:

a processor;

a non-transitory memory coupled to the processor, said memory storing computer program instructions, wherein when the processor executes the computer program instructions, the processor causes the application server to:

send a SIP subscription request message to the application server and receive a SIP response message from the application server;

determine whether the SIP response message indicates that an established SIP dialogue already exists with the requesting server, wherein the requesting server concludes that the established SIP dialogue does not already exist if a first type of SIP response message is received, and concludes that the established SIP dialogue already exists if a second type of SIP response message is received, wherein the second type of SIP response message is different from the first type of SIP response message;

establish a new SIP dialogue in response to a determination that the SIP response message indicates that the established SIP dialogue does not already exist with the requesting server; and utilize the existing established SIP dialogue to support the requested SIP subscription in response to a determination that the SIP response message indicates that the established dialogue already exists with the requesting server; and create and store in the requesting server, a subscription-dialogue relation associating the application server and the requested SIP subscription with the established SIP dialogue.

11. The requesting server according to claim 10, wherein the communication network is an IP Multimedia Subsystem (IMS) network and, wherein:

the application server is a presence server;

the requesting server is a Resource List Server;

the SIP subscription request message is a SIP SUBSCRIBE message;

the first type of SIP response message is a SIP 200 OK message; and the second type of SIP response message is a SIP 301 Moved Permanently message.

* * * * *